US012477062B2

(12) United States Patent
Mardakis et al.

(10) Patent No.: US 12,477,062 B2
(45) Date of Patent: Nov. 18, 2025

(54) DYNAMIC NUMBER IDENTIFICATION MANAGEMENT BASED ON CALL TYPE DETERMINATION

(71) Applicant: MOTOROLA SOLUTIONS, INC., Chicago, IL (US)

(72) Inventors: Steve Mardakis, Gatineau (CA); Timothy John Manczko, Elk Grove Village, IL (US); Michel Moubarak, Chelsea (CA); Michael Jay Nelson, Longmont, CO (US); Scott J. Pappas, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 321 days.

(21) Appl. No.: 18/332,417

(22) Filed: Jun. 9, 2023

(65) Prior Publication Data

US 2024/0414265 A1    Dec. 12, 2024

(51) Int. Cl.
*H04M 3/42* (2006.01)

(52) U.S. Cl.
CPC .... *H04M 3/42059* (2013.01); *H04M 2242/04* (2013.01); *H04M 2242/30* (2013.01)

(58) Field of Classification Search
CPC ......... H04M 3/42059; H04M 2242/04; H04M 2242/30; H04M 3/5116
See application file for complete search history.

(56) References Cited

U.S. PATENT DOCUMENTS

| 7,940,896 | B2 | 5/2011 | Prozeniuk et al. | |
|---|---|---|---|---|
| 8,442,481 | B2 | 5/2013 | Maier et al. | |
| 9,706,378 | B2* | 7/2017 | Mahendran | H04W 4/90 |
| 2006/0078094 | A1* | 4/2006 | Breen | H04M 3/5116 379/50 |
| 2008/0240371 | A1* | 10/2008 | Gray | H04M 11/04 379/37 |
| 2009/0141870 | A1* | 6/2009 | Coster | H04L 65/40 379/45 |
| 2010/0166154 | A1* | 7/2010 | Peters | H04Q 3/66 379/45 |

(Continued)

OTHER PUBLICATIONS

Best Current Practice for Communications Services in Support of Emergency Calling (Year: 2013).*

*Primary Examiner* — Nizar N Sivji
(74) *Attorney, Agent, or Firm* — Michael Best & Friedrich LLP

(57) ABSTRACT

One example device may be configured to determine that a destination public safety answering point (PSAP) of a received first call operates in a legacy PSAP domain. In response such a determination, the device may determine whether the first call is of a first type of call that includes an original number identification or of a second type of call that does not include an original number identification. In response to determining that the first call is of the first type, the device may deliver the first call to the destination PSAP along with an original number identification of the first call. In response to determining that the first call is of the second type, the device may generate a crafted number identification for the first call, and deliver the first call to the destination PSAP along with the crafted number identification.

14 Claims, 8 Drawing Sheets

(56) References Cited

U.S. PATENT DOCUMENTS

| | | | |
|---|---|---|---|
| 2011/0058658 A1* | 3/2011 | Li | H04L 65/1016 |
| | | | 370/352 |
| 2018/0352094 A1* | 12/2018 | Ginter | H04L 65/1046 |
| 2019/0068784 A1* | 2/2019 | Reddy | H04M 3/5116 |
| 2021/0352175 A1* | 11/2021 | Nelson | H04W 4/029 |
| 2023/0171847 A1* | 6/2023 | Deliligkas | H04W 76/15 |
| | | | 370/329 |

* cited by examiner

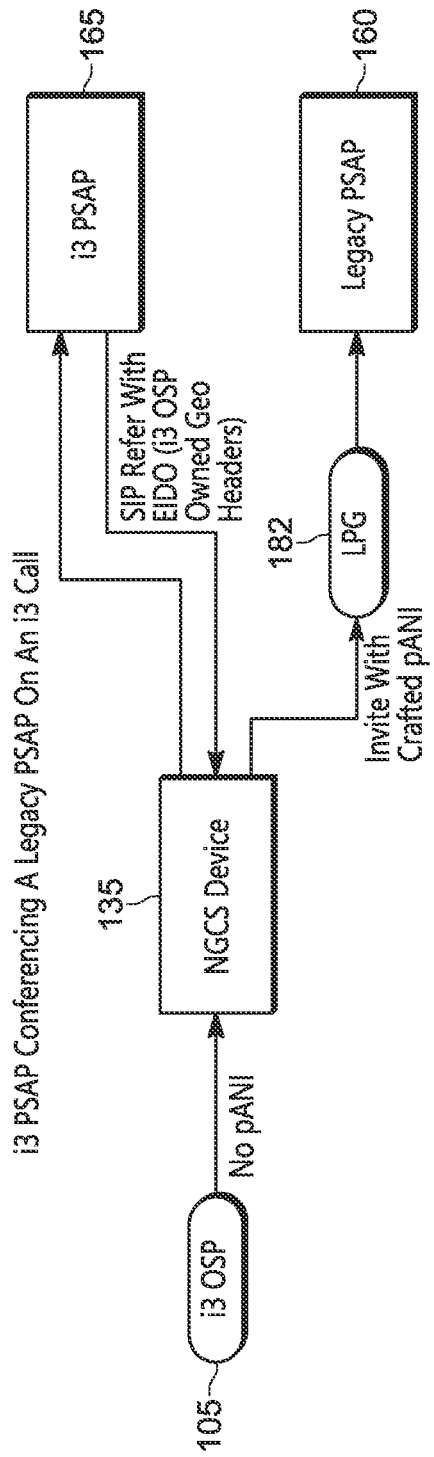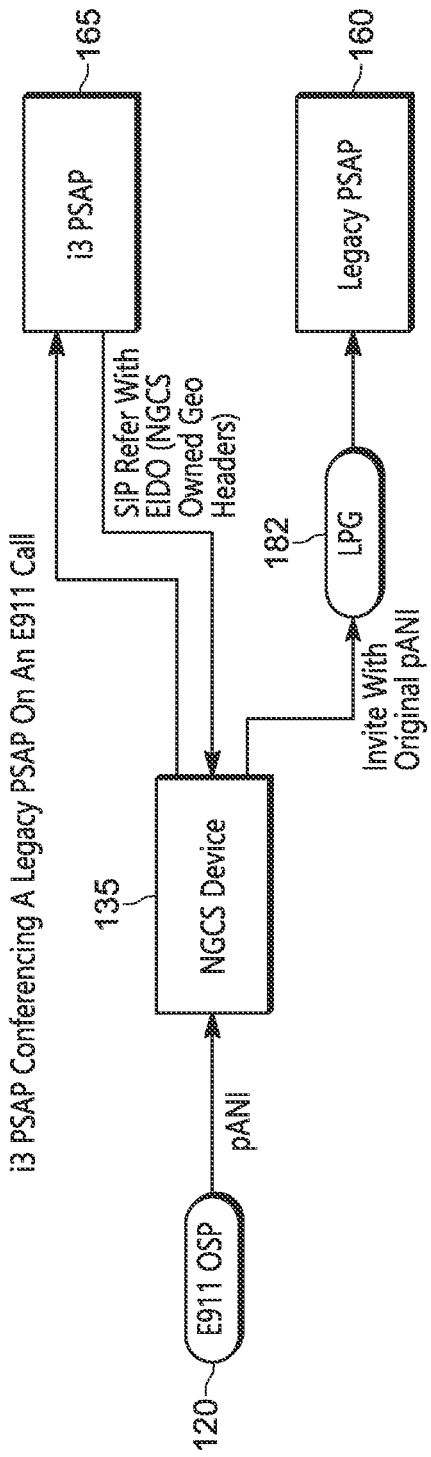

DYNAMIC NUMBER IDENTIFICATION MANAGEMENT BASED ON CALL TYPE DETERMINATION

BACKGROUND OF THE INVENTION

Many calls are placed to public safety agencies regarding public safety incidents. An originating service provider (OSP) domain from which a call is initiated may be different for different calls placed by different devices. Additionally, public safety answering points (PSAPs) that receive the calls may operate in different domains.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate aspects, features, and embodiments of concepts that include the claimed invention, and explain various principles and advantages of those aspects, features, and embodiments.

FIGS. 8A-8C illustrate three distinct call flow diagrams for example situations in which the NGCS device of FIG. 1 receives a conference/transfer request from a destination device of FIG. 1 regarding a call that was previously delivered to the destination device by the NGCS device according to one example aspect.

Figure 1:
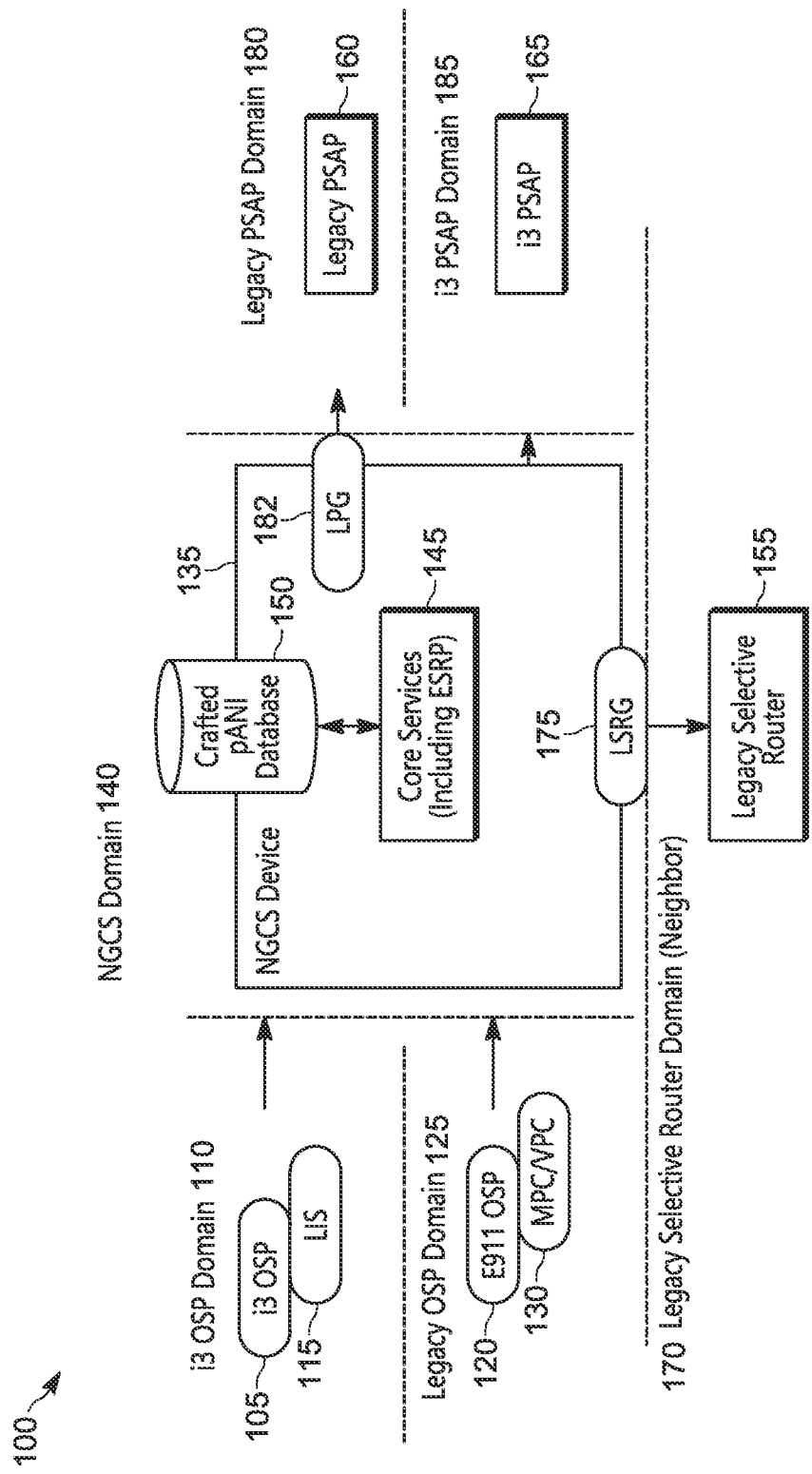
FIG. 1 is a diagram of a communication system according to one example aspect.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of aspects, features, and embodiments.

The apparatus and method components have been represented where appropriate by conventional symbols in the drawings, showing only those specific details that are pertinent to understanding the aspects, features, and embodiments of the present invention so as not to obscure the disclosure with details that will be readily apparent to those of ordinary skill in the art having the benefit of the description herein.

DETAILED DESCRIPTION OF THE INVENTION

As explained above, many calls are placed to public safety agencies to and/or from different domains. For example, a call may be placed in an originating service provider (OSP) domain of a transmitting device and may be received in a domain in which a recipient public safety answering point (PSAP) is operating. Despite the different possible domains from which a call is placed and to which the call is intended to be delivered, it is important to deliver the call with accurate associated information (e.g., location information) or such that accurate associated information may be retrieved by a recipient/destination device.

The different domains noted above exist due to some OSPs and some PSAPs including upgraded call systems that operate in an upgraded domain (e.g., an i3 domain compliant with i3 standards from the National Emergency Number Association (NENA)). However, some OSPs and PSAPs still continue to operate in a legacy domain (e.g., a legacy PSAP domain, a legacy selective router domain, or the like). A Next Generation Core Services (NGCS) system and/or device may be used to mediate between OSPs and PSAPs that are operating in different domains (e.g., for receiving and routing calls to be delivered to PSAPs from OSPs in different domains). The NGCS system may receive calls from different OSP domains and may deliver the calls to destination PSAPs in the same or a different domain as a respective received call. For example, an NGCS system operating under NENA standards may attempt to treat all received calls equally by upgrading legacy calls (e.g., e-911 calls) to i3 calls. Calls that are received as i3 calls are also treated as i3 calls but do not require any upgrading because they are already i3 calls.

With all received calls being i3 calls themselves or being upgraded to be i3 calls, the NGCS system may then provide each call to its respective destination PSAP. For example, upgraded destination PSAPs that operate in an upgraded domain (e.g., an i3 domain) may receive the i3 calls from the NGCS system. However, legacy destination PSAPs that operate in a legacy domain are not configured to receive the i3/upgraded calls. Rather, the NGCS system downgrades an i3 call to legacy format as explained herein and then delivers the downgraded legacy call to the legacy destination PSAP.

As explained above, in situations in which a legacy call is received by the NGCS system and is delivered to legacy PSAP, the NGCS system upgrades the legacy call to an i3/upgraded call and then downgrades the i3/upgraded call back to a legacy call. In doing so, the NGCS system adds its own associated information (e.g., a reference to location information that is stored by the NGCS system) since the original associated information of the legacy call is removed from the legacy call when the legacy call is upgraded to the i3/upgraded call. More specifically, legacy calls include a pseudo automatic number identification (pANI) that is an identifier that allows legacy PSAPs (e.g., e-911 systems) to query a mobile positioning center (MPC) and/or a Voice over Internet Protocol (VoIP) positioning center (VPC) in order to retrieve a location of each legacy call. On the other hand, i3 calls do not include a pANI. Rather, i3 calls include header information that can be used by an i3 PSAP in combination with Hypertext Transfer Protocol (HTTP)-Enabled Location Delivery (HELD) Protocol to acquire location information of each i3 call from a location information server (LIS). When the NGCS system upgrades a received legacy call to an i3 call, the original pANI is removed, and i3 compliant header information is added to the call. When the NGCS system downgrades the call back to a legacy call, the NGCS system creates a crafted pANI that is different from the original pANI. The NGCS system maintains a database of crafted pANIs that can be referenced by legacy PSAPs and that allows the NGCS system to retrieve location information associated with a respective call in order for such location information to be provided to the respective legacy PSAP.

However, in existing NGCS systems, many unnecessary crafted pANIs are created and stored by the NGCS system. Specifically, the NGCS system creates and stores a crafted pANI even when the received call is a legacy call and the destination PSAP is a legacy PSAP. The creation and storage of these unnecessary crafted pANIs in such situations uses unnecessary computing power and storage/memory. Additionally, the creation and storage of these unnecessary crafted pANIs increases the likelihood of incorrect information being provided to legacy PSAPs since the NGCS system acts as an unnecessary intermediary between the legacy PSAP and systems/devices that provide location information about a respective call. Accordingly, there is a technological problem with how current NGCS systems receive and deliver calls. Specifically, there is a technological problem with NGCS systems that handle multiple types of calls (e.g., calls from multiple OSP domains) for delivery to multiple types of PSAP domains by converting all incoming calls to an i3/upgraded call type.

To address the above-noted technological problem, disclosed are, among other things, methods, devices, and systems to dynamically handle received calls based on their respective call type and their respective call destination. The disclosed methods, devices, and systems manage number identification (e.g., a pANI) of each call being routed to a legacy PSAP based on whether the received call is a legacy call or an i3/upgraded call. Accordingly, the disclosed methods, devices, and systems address the above-noted technological problem by adapting the NGCS system to only create crafted pANIs for received i3/upgraded calls while using the original pANIs of received legacy calls. Using the original pANI's of received legacy calls eliminates the NGCS system from being involved in location information retrieval by the legacy PSAPs that instead may query an automatic location identification (ALI) database on their own using the original pANI of the received legacy call. Such retrieval of location information allows a more direct path to the MPC/VPC that reduces dependency and liability on the NGCS system, which may allow the NGCS system to operate more efficiently by using less processing power and using less storage/memory. Additionally, because less components are involved in the retrieval of location information, the disclosed methods, devices, and systems reduce the likelihood of errors when location information is being retrieved (e.g., reducing likelihood of incorrect information being provided to legacy PSAPs).

One embodiment provides an electronic computing device that may include a network interface that may be configured to receive a plurality of calls of a first type from a first type of originating service provider (OSP). Each call of the plurality of calls of the first type may include a respective original number identification. The network interface also may be configured to receive a plurality of calls of a second type from a second type of OSP. Each call of the plurality of calls of the second type may not include the respective original number identification. The electronic computing device may also include an electronic processor coupled to the network interface. The electronic processor may be configured to receive a first call via the network interface, and determine that the first call is of the first type. The electronic processor also may be configured to determine that a destination public safety answering point (PSAP) of the first call operates in a legacy PSAP domain. The electronic processor also may be configured to in response to determining that the first call is of the first type and that the destination PSAP of the first call operates in the legacy PSAP domain, deliver, via the network interface, the first call to the destination PSAP of the first call along with an original number identification of the first call. The electronic processor also may be configured to receive a second call via the network interface, and determine that the second call is of the second type. The electronic processor also may be configured to determine that a destination PSAP of the second call operates in the legacy PSAP domain or in another legacy PSAP domain. The electronic processor also may be configured to in response to determining that the second call is of the second type and that the destination PSAP of the second call operates in the legacy PSAP domain or in another legacy PSAP domain, generate a crafted number identification for the second call, and deliver, via the network interface, the second call to the destination PSAP of the second call along with the crafted number identification for the second call.

Another embodiment provides a method of delivering calls. The method may include receiving, with a network interface of an electronic computing device, a plurality of calls of a first type from a first type of originating service provider (OSP). Each call of the plurality of calls of the first type may include a respective original number identification. The method may also include receiving, with the network interface, a plurality of calls of a second type from a second type of OSP. Each call of the plurality of calls of the second type may not include the respective original number identification. The method may also include receiving, with an electronic processor of the electronic computing device, a first call via the network interface. The method may also include determining, with the electronic processor, that the first call is of the first type. The method may also include determining, with the electronic processor, that a destination public safety answering point (PSAP) of the first call operates in a legacy PSAP domain. The method may also include in response to determining that the first call is of the first type and that the destination PSAP of the first call operates in the legacy PSAP domain, delivering, with the electronic processor and via the network interface, the first call to the destination PSAP of the first call along with an original number identification of the first call. The method may also include receiving, with the electronic processor, a second call via the network interface. The method may also include determining, with the electronic processor, that the second call is of the second type. The method may also include determining, with the electronic processor, that a destination PSAP of the second call operates in the legacy PSAP domain or in another legacy PSAP domain. The method may also include in response to determining that the second call is of the second type and that the destination PSAP of the second call operates in the legacy PSAP domain or in another legacy PSAP domain, generating, with the electronic processor, a crafted number identification for the second call, and delivering, with the electronic processor and via the network interface, the second call to the destination PSAP of the second call along with the crafted number identification for the second call.

Another embodiment provides an electronic computing device that may include a network interface that may be configured to receive a plurality of calls of a first type from a first type of originating service provider (OSP). Each call of the plurality of calls of the first type may include a respective original number identification. The network interface may also be configured to receive a plurality of calls of a second type from a second type of OSP. Each call of the plurality of calls of the second type may not include the respective original number identification. The electronic computing device may also include an electronic processor coupled to the network interface. The electronic processor may be configured to receive a first call via the network interface, and determine that a destination public safety answering point (PSAP) of the first call operates in a legacy PSAP domain. The electronic processor may also be configured to in response to determining that the destination PSAP of the first call operates in the legacy PSAP domain, determine whether the first call is of the first type or of the second type. The electronic processor may also be configured to in response to determining that the first call is of the first type, deliver, via the network interface, the first call to the destination PSAP of the first call along with an original number identification of the first call. The electronic processor may also be configured to in response to determining that the first call is of the second type, generate a crafted number identification for the first call, and deliver, via the network interface, the first call to the destination PSAP of the first call along with the crafted number identification for the first call.

For ease of description, some or all of the example systems and devices presented herein are illustrated with a single example of each of its component parts. Some examples may not describe or illustrate all components of the systems or devices. Other example aspects, features, and embodiments may include more or fewer of each of the illustrated components, may combine some components, or may include additional or alternative components.

In some instances, a PSAP is operated by one or more public safety agencies (e.g., a police department, a fire department, a first aid/paramedic agency, etc.) that handle public safety incidents. In some instances, a public safety incident includes an incident in which public safety officers are supervising, maintaining order, providing assistance, and the like. In some instances, the public safety incident is an event, occurrence, or situation in which officers are involved. For example, the public safety incident may be an incident in which public safety officers are called to a location to provide assistance in resolving or preventing a societal or environmental problem (for example, a location where a suspect is committing or has committed a crime, a fire, a vehicular accident, a traffic stop, a location where a natural disaster such as a tornado or earthquake has occurred, and the like). In some instances, public safety incidents include incidents involving public service agencies (for example, waste disposal agencies, water management agencies, and the like). In some instances, public safety officers include police officers, paramedics, firefighters, dispatchers, and the like. In some instances, public safety officers/personnel include public service employees and/or other employees employed by public service agencies.

FIG. 1 is a diagram of a communication system 100 according to one example. In the example illustrated, the communication system 100 includes various devices operating in various domains. The communication system 100 includes an i3 OSP device 105 (i.e., upgraded OSP device 105) configured operate in an i3 OSP domain 110 (i.e., upgraded OSP domain 110). Header information in calls transmitted by the i3 OSP device 105 may refer to a LIS 115 to indicate a location of each call as explained previously herein. The communication system 100 also includes an e-911 OSP device 120 (i.e., a legacy OSP device 120) configured to operate in a legacy OSP domain 125 (e.g., an e-911 OSP domain). A pANI in each call transmitted by the e-911 OSP device 120 may refer to a MPC/VPC 130 to indicate a location of the call as explained previously herein. Although only a single instance of elements 105, 115, 120, and 130 are shown in FIG. 1, additional similar instances of some or all of these elements may be included in the communication system 100 in some instances.

As indicated by the arrows from the i3 OSP device 105 and from the e-911 OSP device 120 in FIG. 1, calls may be transmitted from the i3 OSP device 105 and from the e-911 OSP device 120 to a NGCS system/device 135 that operates in a NGCS domain 140. For example, calls may be placed by users (e.g., citizens) on a communication device such as a cellular phone (e.g., a smart phone). The calls may be provided to the NGCS system 135 by the OSP devices 105, 120 (e.g., cellular base stations and the like) that are part of respective OSP networks that operate according to respective OSP domains 110, 125.

The NGCS device 135 may be configured to receive calls from the OSP devices 105, 120; re-format calls as necessary as explained in greater detail herein; and deliver calls to destination devices. In some instances, the NGCS device 135 includes one or more components 145 configured to provide core services such as receiving calls, analyzing calls, re-formatting calls as necessary (e.g., creating crafted pANIs for i3 calls that are to be delivered to legacy destination devices), and delivering calls to destination devices. For example, the one or more components 145 may include a first electronic processor 205 (see FIG. 2) configured to provide the core services. In some instances, the core services include emergency services routing proxy (ESRP) services. The NGCS device 135 may also include a crafted pANI database 150 to store crafted pANIs that are generated for received i3 calls that are to be delivered to legacy destination devices. In some instances, the crafted pANI database 150 may also store original pANIs of received legacy calls as well as other call information about received calls.

The NGCS device 135 may be configured to deliver calls to various destination devices. For example, destination devices of the communication system 100 of FIG. 1 include a legacy selective router 155, a legacy PSAP 160 (e.g., an e-911 PSAP 160), and an i3 PSAP 165 (i.e., an upgraded PSAP 165). The legacy selective router 155 may operate in a legacy selective router domain 170 (e.g., a legacy domain) as a neighbor of the NGCS device 135. The NGCS device 135 may include a legacy selective router gateway (LSRG) 175 to deliver calls to the legacy selective router 155. The legacy PSAP 160 may operate in a legacy PSAP domain 180 (e.g., another legacy domain). The NGCS device 135 may include a legacy PSAP gateway (LPG) 182 to deliver calls to the legacy PSAP 160. Calls delivered to the legacy selective router 155 and/or the legacy PSAP 160 may include a pANI (e.g., an original pANI or a crafted pANI) to allow the destination devices 155, 160 to retrieve location information for the calls in accordance with legacy domains/protocols (e.g., e-911 domain/protocol). The i3 PSAP 165 may operate in an i3 PSAP domain 185 (i.e., an upgraded PSAP domain 185). Calls delivered to the i3 PSAP 165 may not include a pANI and instead include header information that allows the i3 PSAP 165 to determine/retrieve location information for the calls in accordance with i3/upgraded domains/protocols. Although only a single instance of each if the destination devices 155, 160, and 165 is shown in FIG. 1, additional or fewer instances of some or all of these destination devices 155, 160, and 165 may be included in the communication system 100 in other examples.

In some instances, the devices of FIG. 1 communicate with each other and/or with other devices over a communication network including one or more radio frequency (RF) site controllers, base stations, or the like (for example, by sending and receiving radio signals to and from an RF site controller, a base station, or the like). In some instances, the communication network implements the Long Term Evolution (LTE) (including LTE-Advanced or LTE-Advanced Pro compliant with, for example, the $3^{rd}$ Generation Partnership Project (3GPP) Technical Specification (TS) 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over Internet Protocol (IP) (VOIP), or a PTT over IP (PoIP) application may be implemented. In some instances, one or more devices of FIG. 1 may operate as an RF site controller, as a base station, or as another call routing device that allows the communication system 100 to provide calls from one device to another device. The communication network may include wireless and wired portions. In some instances, the communication network is implemented using a direct-mode, conventional, or trunked land mobile radio (LMR) standard or protocol, for example, European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. The communication network may also include future developed networks. In some instances, the communication network may also include a combination of the networks mentioned. In some instances, the devices of FIG. 1 may communicate directly with each other using a communication channel or connection (e.g., a wired connection).

While this disclosure primarily refers to calls be received by the NGCS device 135 and delivered to a destination device 155, 160, 165, it should be understood that other types of data may be received and delivered in a similar manner. For example, messages such as text messages may be transferred in a similar manner as calls. Accordingly, the term "call" represents any kind of data transfer using elements of the communication system 100 including, but not limited to, calls, text messages, other messages, and/or the like.

Figure 2:
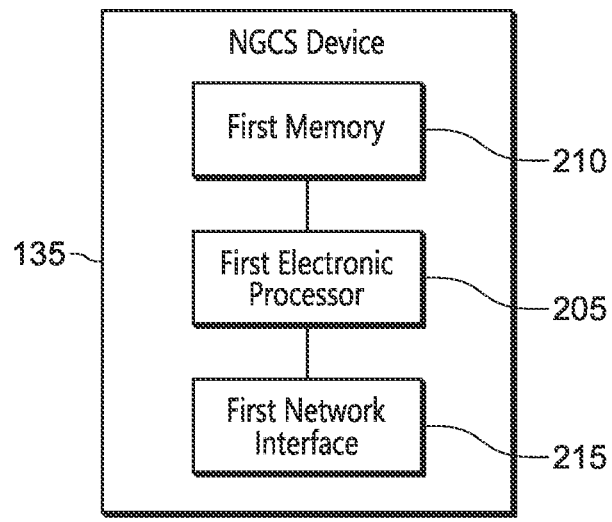
FIG. 2 is a diagram of a Next Generation Core Services (NGCS) device included in the communication system of FIG. 1 according to one example aspect.

FIG. 2 is a block diagram of the NGCS device 135 of the communication system 100 according to one example instance. In the example shown, the NGCS device 135 includes a first electronic processor 205 (for example, a microprocessor or another electronic device). The first electronic processor 205 may include input and output interfaces (not shown) and be electrically connected to a first memory 210 and a first network interface 215 (e.g., including a first network transceiver connected to a first antenna).

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform at least some of the methods described herein. In some instances, the crafted pANI database 150 is part of the first memory 210. In some instances, the crafted pANI database 150 may be located remotely from the NGCS device 135 and may be accessed by the NGCS device 135 to read and write data. In some instances, the crafted pANI database 150 is a combination of local memory (e.g., the first memory 210) and of a remotely located database.

The first network interface 215 is configured to send and receive data (e.g., calls) to and from other devices in the communication system 100 (for example, over the communication network described previously herein). For example, the first network interface 215 includes a wireless communication transceiver for wirelessly communicating with other devices. Alternatively or in addition, the first network interface 215 may include a connector or port for receiving a wired connection to the communication network, such as an Ethernet cable. The first electronic processor 205 receives electrical signals representing data associated with calls from OSP devices 105, 120 via the network interface 215. The first electronic processor 205 may also communicate information relating to the calls to other devices via the network interface 215.

In some instances, the NGCS device 135 may include fewer or additional components in configurations different from that illustrated in FIG. 2. For example, in some instances, the NGCS device 135 includes additional electronic processors 205, memories 210, and/or network interfaces 215. In some instances, the NGCS device 135 includes multiple electronic processors 205 within a single device and/or multiple electronic processors 205 distributed across multiple devices that may be remotely located from each other. Such multiple devices may be considered a single NGCS device/system 135, and one or more of such electronic processors 205 may perform the functionality of the NGCS device 135 described herein. In some instances, the NGCS device 135 itself or a combination of devices that make up the NGCS device/system 135 may be referred to as an electronic computing device that includes one or more electronic processors 205. For example, the electronic computing device may be a single electronic processor 205 (for example, the first electronic processor 205) or a plurality of electronic processors 205 located in the same location/device or in different locations/devices. The NGCS device/system 135 and its electronic processor(s) 205 may be located at a public safety command center, at a remote location, and/or at a remote cloud-computing cluster. In some instances, the NGCS device 135 performs additional functionality than the functionality described herein.

Unless the context of their usage unambiguously indicates otherwise, the articles "a," "an," and "the" should not be interpreted as meaning "one" or "only one." Rather, these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed, for example, as described previously herein with respect to the electronic computing device that may make up the NGCS device/system 135.

Figure 3:
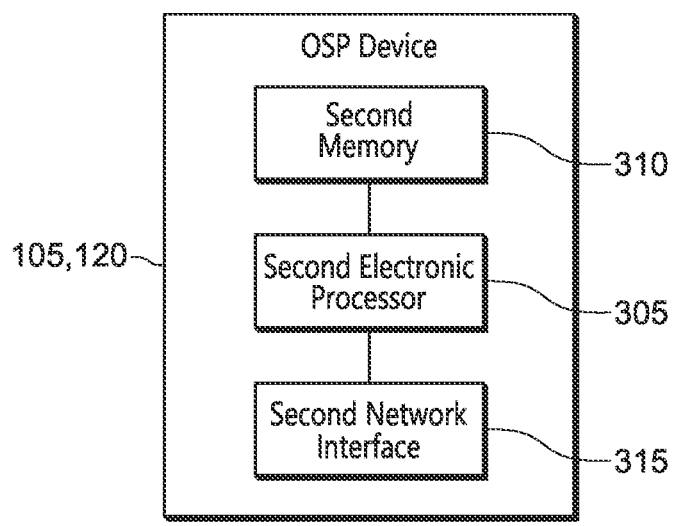
FIG. 3 is a diagram of an originating service provider (OSP) device included in the communication system of FIG. 1 according to one example aspect.

FIG. 3 is a block diagram of the OSP devices 105, 120 according to one example instance. In the example illustrated, the OSP device 105, 120 may be a base station, a server, etc. that includes a second electronic processor 305, an input/output interface (not shown), a second memory 310, and a second network interface 315 (for example, including a transceiver and an antenna). These components are similar to those described above with respect to the NGCS device 135 and perform similar general functions. For example, the second electronic processor 305 executes instructions stored in the second memory 310 to receive calls from user communication devices (e.g., smart phones, etc.) via the second network interface 315. The second electronic processor 305 may also transmit the calls to the NGCS device 135 via the network interface 315. In some instances, the OSP device 105, 120 may include fewer or additional components in configurations different from that illustrated in FIG. 3. For example and similar to the description of the NGCS device/system 135 above, the OSP device 105, 120 may include additional electronic processors 305, memories 310, and/or network interfaces 315 located on the same device or distributed amongst numerous devices that make up the OSP device 105, 120. In some instances, the OSP device 105, 120 performs additional functionality than the functionality described herein. While FIG. 3 generally represents both the OSP device 105 and the OSP device 120, in some instances, the OSP device 105 includes a different combination of components/devices and/or functions differently than the OSP device 120. For example, as indicated in FIG. 1, the i3 OSP device 105 may operate in the i3 OSP domain 110 (i.e., an upgraded domain 110) according to an i3 compliant protocol for transmitting calls (e.g., calls include certain header information but do not include a pANI) while the e-911 OSP device 120 may operate in a legacy OSP domain 125 according to a legacy protocol for transmitting calls (e.g., calls include a pANI but may not include at least some of the header information that is included in i3 calls).

Figure 4:
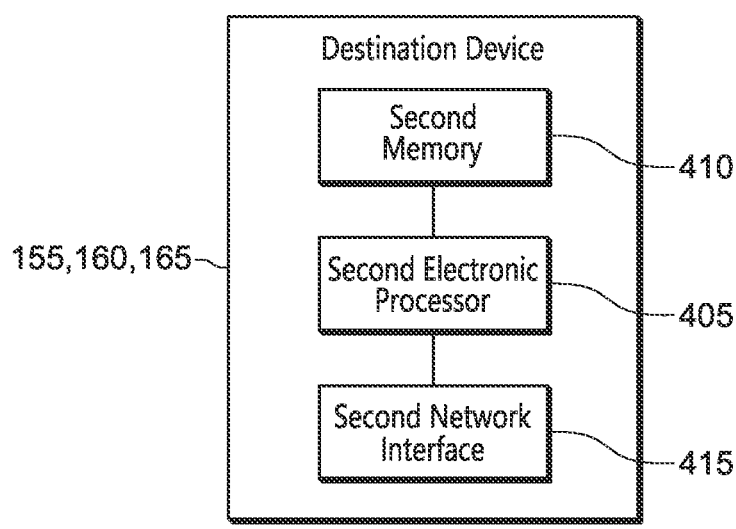
FIG. 4 is a diagram of a destination device such as a public safety answering point (PSAP) included in the communication system of FIG. 1 according to one example aspect.

FIG. 4 is a block diagram of the destination devices 155, 160, 165 according to one example instance. In the example illustrated, the destination device 155, 160, 165 is a device/system, server, etc. that includes a third electronic processor 405, an input/output interface (not shown), a third memory 410, and a third network interface 415 (for example, including a transceiver and an antenna). These components are similar to those described above with respect to the NGCS device 135 and perform similar general functions. For example, the third electronic processor 405 executes instructions stored in the third memory 410 to receive calls from the NGCS device 135 via the third network interface 415. The second electronic processor 305 may also transmit the calls to public safety communication devices such as workstations/dispatch consoles at a public safety command center, for example, to allow the calls to be handled by a dispatcher or other public safety personnel. In some instances, the destination device 155, 160, 165 may include fewer or additional components in configurations different from that illustrated in FIG. 3. For example and similar to the description of the NGCS device/system 135 above, the destination device 155, 160, 165 may include additional electronic processors 405, memories 410, and/or network interfaces 415 located on the same device or distributed amongst numerous devices that make up the destination device 155, 160, 165. As another example, the destination device 155, 160, 165 may include a display, a microphone, a speaker, other user input/output devices (e.g., on a workstation/dispatch console). In some instances, the destination device 155, 160, 165 performs additional functionality than the functionality described herein. While FIG. 4 generally represents each of the destination devices 155, 160, 165, in some instances, each destination device 155, 160, 165 includes a different combination of components/devices and/or functions differently than other destination devices 155, 160, 165. For example, as indicated in FIG. 1, the legacy selective router 155 and the legacy PSAP 160 may operate in a legacy domain 170, 180 according to a legacy protocol for receiving calls (e.g., received calls include a pANI but may not include at least some of the header information that is included in i3 calls) while the i3 PSAP 165 may operate in the i3 PSAP domain 185 (i.e., an upgraded domain 185) according to an i3 compliant protocol for receiving calls (e.g., received calls include certain header information but do not include a pANI).

Although not shown in separate figures, in some instances, the other elements of the communication system 100 of FIG. 1 may include similar general components as the NGCS device 135 (e.g., an electronic processor, a memory, and a network interface) that perform similar general functionality. For example, the LIS 115 and the MPC/VPC 130 may include these components to receive requests for location information from other devices and provide location information in response to such requests. As another example, the LSRG 175 and the LPG 182 may include these components to transmit calls from the NGCS device 135 to legacy destination devices 155, 160.

Figure 5:
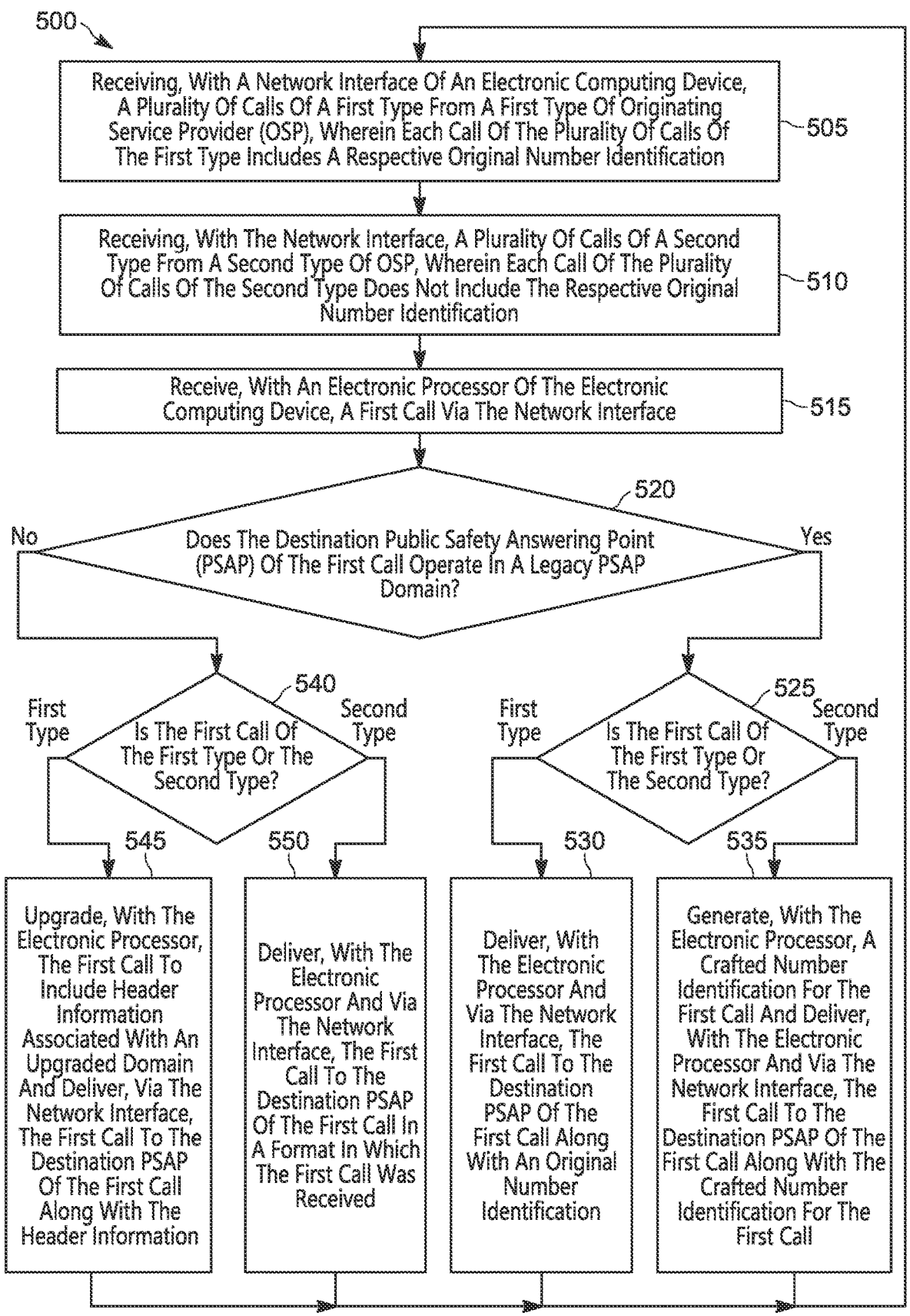
FIG. 5 is a flowchart of a method performed by the NGCS device of FIG. 1 to dynamically handle received calls based on their respective call type and their respective call destination according to one example aspect.

FIG. 5 illustrates a flowchart of a method 500 performed by the electronic computing device of the NGCS device 135 (e.g., one or more electronic processors 205 of the electronic computing device described previously herein) to dynamically handle received calls based on their respective call type and their respective call destination. While a particular order of processing steps, call receptions, and/or call transmissions is indicated in FIG. 5 as an example, timing and ordering of such steps, receptions, and transmissions may vary where appropriate without negating the purpose and advantages of the examples set forth in detail throughout the remainder of this disclosure. For the sake of readability, the below explanation refers to "the electronic processor" of the electronic computing device performing steps of the methods 500, 600 and other actions. Nevertheless, it should be understood that the steps and sub-steps of the methods 500, 600 as well as other actions described herein may be performed by any one or a combination of different electronic processors of the electronic computing device. In other words, "the electronic processor" means "any one or a combination of the one or more electronic processors" of the electronic computing device and not the same single electronic processor of the one or more electronic processors of the electronic computing device unless the usage of "the electronic processor" unambiguously indicates otherwise.

At block 505, the NGCS device 135 receives, with the first network interface 215, a plurality of calls of a first type (e.g., legacy calls such as e-911 calls) from a first type of OSP (e.g., a legacy OSP such as the e-911 OSP device 120). Each call of the plurality of calls of the first type includes a respective original number identification (e.g., an original pANI). In some instances, a call is considered to be of the first type because the call includes the original number identification that was populated by the legacy OSP device 120 as determined by the NGCS device 135 as explained in greater detail below. The NGCS device 135 may receive the plurality of calls of the first type at various times over an extended time period of operation (e.g., throughout hours, days, weeks, etc. of operation).

At block 510, the NGCS device 135 receives, with the first network interface 215, a plurality of calls of a second type (e.g., upgraded calls such as i3 calls) from a second type of OSP (e.g., an upgraded OSP such as the i3 OSP device 105). Each call of the plurality of calls of the second type does not include the respective original number identification (e.g., an original pANI). In some instances, a call is considered to be of the second type because the call does not include the original number identification and instead includes header information that was populated by the i3 OSP device 105. The NGCS device 135 may receive the plurality of calls of the second type at various times over an extended time period of operation (e.g., throughout hours, days, weeks, etc. of operation).

At block 515, the first electronic processor 205 of the NGCS device 135 receives a first call via the first network interface 215. The first call may be included in one of the plurality of calls of the first type and the plurality of calls of the second type.

At block 520, the first electronic processor 205 determines whether a destination PSAP 155, 160, 165 of the first call operates in a legacy PSAP domain 170, 180. In some instances, the first electronic processor 205 is configured to determine that the destination PSAP 155, 160, 165 of the first call operates in the legacy PSAP domain 170, 180 by (i) determining the destination PSAP 155, 160, 165 of the first call based on call information of the first call and (ii) interrogating the destination PSAP 155, 160, 165 to determine an operating domain of the destination PSAP 155, 160, 165; referencing a stored mapping of the destination PSAP 155, 160, 165 to determine the operating domain of the destination PSAP 155, 160, 165; or both interrogating the destination PSAP 155, 160, 165 and referencing the stored mapping to determine the operating domain of the destination PSAP 155, 160, 165.

In some instances, the first electronic processor 205 accesses call information of the first call (e.g., a pANI if one is included, i3 compliant header information if such information is included, or the like). The first electronic processor 205 may use the call information to determine a location from which the first call was placed. For example, the first electronic processor 205 may use the pANI (i.e., the number identification) to query location information of the first call from the MPC/VPC 130. As another example, the first electronic processor 205 may use the header information to query location information of the first call from the LIS 115. As another example, the header information may include a location by value (e.g., a specific location value) such that the first electronic processor 205 does not query location information from another device. In some instances, a destination number (e.g., a Routing Digits Number (RDN)) included in the header information of a call may directly indicate where the call should be routed.

Once the first electronic processor 205 determines the location from which the first call was placed, the first electronic processor 205 may determine a destination PSAP 155, 160, 165 for the first call based on the location from which the first call was placed. For example, the electronic processor 205 may reference the first memory 210 and/or a database that indicates a destination PSAP 155, 160, 165 for each polygon-shaped geographical area based on proximity within or near the polygon-shaped geographical area. The electronic processor 205 may select the nearest destination PSAP 155, 160, 165 within the polygon-shaped area from which the first call was placed as the destination PSAP 155, 160, 165 for the first call. The electronic processor 205 may then perform one or both of interrogating the destination PSAP 155, 160, 165 and referencing a stored mapping of destination PSAP 155, 160, 165 to determine the operating domain of the destination PSAP 155, 160, 165 (e.g., whether the operating domain is an upgraded domain 185 or a legacy domain 170, 180).

In response to determining that the destination PSAP 155, 160 of the first call operates in the legacy PSAP domain 170, 180, at block 525, the first electronic processor 205 determines whether the first call is of the first type (e.g., a legacy call) or of the second type (e.g., an upgraded call). In some instances, the first electronic processor 205 is configured to determine that the first call is of the first type in response to at least one of the group consisting of (i) determining that a geolocation header is not present in call information of the first call; (ii) determining that the geolocation header is present in the call information of the first call and that the geolocation header does not include a location by value or a location by reference that points outside of a location database maintained by the NGCS device 135; (iii) determining that a geolocation routing header is not present in the call information of the first call; (iv) determining that a number identification of the first call points to (e.g., references) the location database maintained by the NGCS device 135 and the location database indicates that the first call is of the first type; and (v) combinations of (i) through (iv).

In some instances, the first electronic processor 205 determines that the first call is of the first type (e.g., a legacy call such as an e-911 call) by determining that a geolocation header and/or a geolocation routing header (e.g., a header that indicates whether the call will be geo-routed) are/is not present in call information of the first call because geolocation headers and/or geolocation routing headers may be present in i3 calls but may not be present in e-911 calls.

In some instances, the first call may initially appear to be an upgraded call of the second type because the call information includes a geolocation header. However, in some instances, such a first call may nevertheless have originated as a legacy call of the first type that was upgraded by the NGCS device 135 or another device before being provided back to the NGCS device 135. Accordingly, to determine an original type of the first call as the type of the first call, the first electronic processor 205 may determine that the call information of the first call includes a geolocation header but that the geolocation header does not include a location by value or a location by reference that points outside of a location database maintained by the NGCS device 135 (e.g., outside of the crafted pANI database 150). For example, geolocation headers that include a location by value (e.g., a specific location value that does not require a destination device 155, 160, 165 to query another device to retrieve location information about the call) may only be produced by upgraded OSP devices 105 and may not be produced by legacy OSP devices 120. Accordingly, the first electronic processor 205 may determine that a geolocation header that includes a location by value was produced by an upgraded OSP device 105. Similarly, geolocation headers that include a location by reference that points (e.g., references) outside of a location database maintained by NGCS device 135 indicate that the NGCS device 135 did not previously create the geolocation header of the first call. Accordingly, the first electronic processor 205 may determine that such a geolocation header was produced by an upgraded OSP device 105. The example geolocation headers described immediately above do not include any reliance on an original pANI to retrieve the location of the first call. Accordingly, the first electronic processor 205 may determine that the first call is a legacy call of the first type in response to determining that the above-noted geolocation header information is not present in the geolocation header call information of the first call.

In some instances, to determine an original type of the first call as the type of the first call, the first electronic processor 205 may determine that a number identification (e.g., a pANI) included in the call information of the first call points to a location database (e.g., the crafted pANI database 150) maintained by the NGCS device 135 and that the location database indicates that the first call is of the first type. For example, when the first call is received by the NGCS device 135 after being delivered to a destination PSAP 155, 160, 165 (e.g., when the destination PSAP 155, 160, 165 is requesting a conference call request with another destination PSAP 155, 160, 165), the first electronic processor 205 may use the pANI of the first call to reference previously stored information in the crafted pANI database 150 from when the NGCS device 135 previously analyzed and handled the first call (as explained in greater detail below) to determine the original type of the first call. If a pANI is not present or if header information references a database that is not maintained by the NGCS device 135, the first electronic processor 205 may determine that the first call is an upgraded call.

In some instances, the first electronic processor 205 determines that the first call is a legacy call of the first type in response to determining that all of characteristics (iii), (iv), and one of (i) and (ii) are true. Conversely, in some instances, if one or both of characteristics (iii) and (iv) are not true or if both of characteristics (i) and (ii) are not true, the first electronic processor 205 may determine that the first call is an upgraded i3 call.

In response to determining that the first call is of the first type (e.g., a legacy call), at block 530, the first electronic processor 205 delivers, via the first network interface 215, the first call to the destination PSAP 155, 160 of the first call along with an original number identification (e.g., an original pANI) of the first call. For example, as opposed to upgrading the legacy call to an upgraded call and then downgrading the upgraded call back to a legacy call by generating a crafted pANI as may be done in current NGCS devices, the NGCS device 135 instead uses the original pANI of the original call since the destination PSAP 155, 160 is a legacy destination PSAP 155, 160 operating in the legacy domain 170, 180. In other words, the original number identification (e.g., the original pANI) of the first call is configured to be used by the destination PSAP 155, 160 of the first call to query location information of the first call. Accordingly, in this situation, retrieval of location information of the first call by the destination PSAP 155, 160 does not involve the NGCS device 135 and instead relies on existing, reliable manners of retrieving location information according to legacy protocols/domains (e.g., e-911). As explained previously herein, such retrieval of location information allows a more direct path to the MPC/VPC 130 that reduces dependency and liability on the NGCS device 135, which may allow the NGCS device 135 to operate more efficiently by using less processing power and using less storage/memory. Additionally, because less components are involved in the retrieval of location information, such retrieval of location information reduces the likelihood of errors when location information is being retrieved (e.g., reduces likelihood of incorrect information being provided to the legacy PSAP 155, 160 from the NGCS device 135).

While the NGCS device 135 provides the original pANI in call information to the destination PSAP 155, 160, the first electronic processor 205 may nevertheless create an i3 compliant geolocation header and/or a call SIP header for including in the call information of the first call or for inclusion in storage of the NGCS device 135 (e.g., the crafted pANI database 150). For example, the first electronic processor 205 may create NENA identification headers to be included in the call SIP header. The first electronic processor 205 may also store first information about the first call in the first memory 210 (e.g., in the crafted pANI database 150) for future reference. For example, if a conference call request regarding the first call is later received by the NGCS device 135, the first electronic processor 205 may determine the type of the first call (e.g., an original type of the first call) by referencing stored information in the first memory 210 as explained herein. The stored first information about the first call may include identification data of the first call (e.g., the original number identification such as the original pANI) and an indication that the first call is of the first type. In some instances, the first electronic processor 205 may not create and store the i3 compliant geolocation header information and/or call SIP header information for the first call until the first electronic processor 205 determines that that first call should be delivered to an upgraded destination PSAP 165 (e.g., in response to a later received conference/transfer request). Accordingly, processing power and storage space of the NGCS device 135 may be saved since some legacy calls may only be routed to legacy destination PSAPs 155, 160.

On the other hand, in response to determining that the first call is of the second type (at block 525) (e.g., an upgraded call), at block 535, the first electronic processor 205 is configured to generate a crafted number identification (e.g., a crafted pANI) for the first call, and deliver, via the first network interface 215, the first call to the destination PSAP 155, 160 of the first call along with the crafted number identification for the first call. For example, the first electronic processor 205 may remove or revise header information included in call information of the first call and reformat the header information to include the crafted pANI (i.e., downgrading the received upgraded call to a legacy call). The crafted number identification (e.g., the crafted pANI) for the first call is configured to be used by the destination PSAP 155, 160 of the first call to query location information of the first call. In some instances, the NGCS device 135 receives a location request including the crafted pANI from a legacy destination device 155, 160. The first electronic processor 205 may use the crafted pANI to reference previously stored location information in the crafted pANI database 150 or retrieve location information about the first call to then be provided back to the destination device 155, 160. In some instances, the first electronic processor 205 may store the received header information that was removed from the first call for future use, for example, if a conference call request regarding the first call is later received by the NGCS device 135. Additionally or alternatively, the first electronic processor 205 may store first information of the first call including identification data of the first call (e.g., the crafted number identification such as the crafted pANI) and an indication that the first call is of the second type in the first memory 210 (e.g., in the crafted pANI database 150) for future reference (e.g., if a conference call request regarding the first call is later received by the NGCS device 135).

Returning to block 520, in response to determining that the destination PSAP 165 of the first call does not operate in the legacy PSAP domain 170, 180 but rather operates in the upgraded domain 185 (e.g., the i3 domain 185), at block 540, the first electronic processor 205 determines whether the first call is of the first type (e.g., a legacy call) or of the second type (e.g., an upgraded call). In some instances, block 540 is similar to block 525 as explained previously herein, and the previous explanation of block 525 applies to block 540.

In response to determining that the first call is of the first type (e.g., a legacy call), at block 545, the first electronic processor 205 upgrades the first call to include header information associated with the upgraded domain 185 (e.g., an i3 domain 185) and delivers, via the first network interface 215, the upgraded first call to the destination PSAP 160 of the first call along with upgraded header information. In some instances, to upgrade the first call, the first electronic processor 205 uses the original pANI of the first call to query the MPC/VPC 130 to retrieve location information of the first call. The first electronic processor 205 may remove the original pANI from call information of the first call and may create an i3 compliant geolocation header and/or a call SIP header for including in the call information of the first call. For example, the first electronic processor 205 may create NENA identification headers to be included in the call SIP header. The NGCS device 135 then delivers the upgraded call (e.g., now an i3 call) with the new call SIP header and/or new geolocation header and location information (by value or by updated reference) to the destination PSAP 165. The first electronic processor 205 may also store first information about the first call (e.g., an indication that the first call was originally received as a legacy first type of call, an original pANI of the first call, location information retrieved using the original pANI, and/or the like) in the first memory 210 (e.g., in the crafted pANI database 150) for future reference. For example, if a conference call request regarding the first call is later received by the NGCS device 135, the first electronic processor 205 may determine the type of the first call (e.g., an original type of the first call) by referencing stored information in the first memory 210 as explained herein.

On the other hand, in response to determining that the first call is of the second type (at block 540) (e.g., an upgraded call), at block 550, the first electronic processor 205 is configured to deliver the first call to a destination PSAP 165 (e.g., geo-route the first call) in its current form. In other words, the first electronic processor 205 may deliver the first call to the destination PSAP 165 without making any changes to the formatting or header information of the first call because the first call is already an upgraded/i3 call and the destination PSAP 165 is an upgraded/i3 PSAP 165. In some instances, the first electronic processor 205 may store first information about the first call (e.g., an indication that the first call was originally received as an updated second type of call and/or the like) in the first memory 210 (e.g., in the crafted pANI database 150) for future reference. For example, if a conference call request regarding the first call is later received by the NGCS device 135, the first electronic processor 205 may determine the type of the first call (e.g., an original type of the first call) by referencing stored information in the first memory 210 as explained herein.

After performing any one of blocks 530, 535, 545, or 550, the method 500 may proceed back to block 505 to repeat the method 500 to continue receiving calls and to continue analyzing and routing received calls as explained herein.

Figure 6:
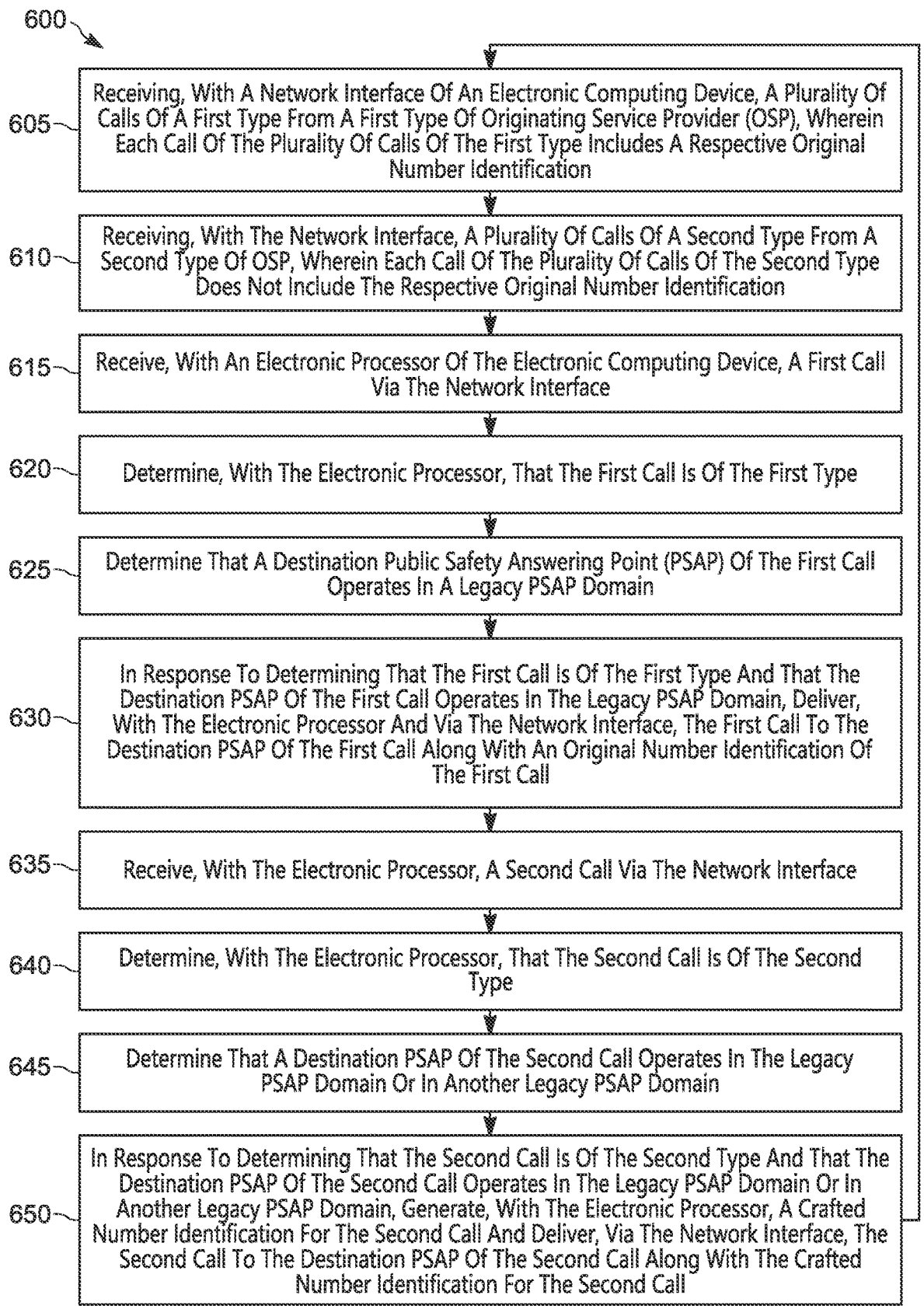
FIG. 6 is a flowchart of another method performed by the NGCS device of FIG. 1 to dynamically handle received calls based on their respective call type and their respective call destination according to one example aspect.

FIG. 6 illustrates a flowchart of a method 600 performed by the electronic computing device of the NGCS device 135 (e.g., one or more electronic processors 205 of the electronic computing device described previously herein) to dynamically handle received calls based on their respective call type and their respective call destination. While a particular order of processing steps, call receptions, and/or call transmissions is indicated in FIG. 6 as an example, timing and ordering of such steps, receptions, and transmissions may vary where appropriate without negating the purpose and advantages of the examples set forth in detail throughout the remainder of this disclosure. The method 600 illustrates two example executions of the method 500.

At block 605 (and similar to block 505 of FIG. 5), the NGCS device 135 receives, with the first network interface 215, a plurality of calls of a first type (e.g., legacy calls such as e-911 calls) from a first type of OSP (e.g., a legacy OSP such as the e-911 OSP device 120). Each call of the plurality of calls of the first type includes a respective original number identification (e.g., an original pANI).

At block 610 (and similar to block 510 of FIG. 5), the NGCS device 135 receives, with the first network interface 215, a plurality of calls of a second type (e.g., upgraded calls such as i3 calls) from a second type of OSP (e.g., an upgraded OSP such as the i3 OSP device 105). Each call of the plurality of calls of the second type does not include the respective original number identification (e.g., an original pANI).

At block 615 (and similar to block 515 of FIG. 5), the first electronic processor 205 of the NGCS device 135 receives a first call via the first network interface 215. The first call may be included in one of the plurality of calls of the first type and the plurality of calls of the second type.

At block 620, the first electronic processor 205 determines that the first call is of the first type. In some instances, block 620 may be similar to blocks 525 and 540 of FIG. 5 and the same explanation applies regarding how the first electronic processor 205 determines a type of call of the first call.

At block 625, the first electronic processor 205 determines that a destination PSAP 155, 160 of the first call operates in a legacy PSAP domain 170, 180. In some instances, block 625 may be similar to block 520 of FIG. 5 and the same explanation applies regarding how the first electronic processor 205 determines a type/domain of the destination PSAP 155, 160.

In response to determining that the first call is of the first type and that the destination PSAP 155, 160 of the first call operates in the legacy PSAP domain 170, 180, at block 630, the first electronic processor 205 delivers, via the first network interface 215, the first call to the destination PSAP 155, 160 of the first call along with an original number identification (e.g., an original pANI) of the first call. In some instances, block 630 may be similar to block 530 of FIG. 5 and the same explanation applies regarding how the first electronic processor 205 delivers the first call to the destination PSAP 155, 160.

At block 635 (and similar to block 615 and to block 515 of FIG. 5), the first electronic processor 205 of the NGCS device 135 receives a second call via the first network interface 215. The second call may be included in one of the plurality of calls of the first type and the plurality of calls of the second type.

At block 640, the first electronic processor 205 determines that the second call is of the second type. In some instances, block 640 may be similar to blocks 525 and 540 of FIG. 5 and the same explanation applies regarding how the first electronic processor 205 determines a type of call of the second call.

At block 645, the first electronic processor 205 determines that a destination PSAP 155, 160 of the second call operates in the legacy PSAP domain 170, 180 or in another legacy PSAP domain 170, 180. In some instances, block 645 may be similar to block 625 and to block 520 of FIG. 5 and the same explanation applies regarding how the first electronic processor 205 determines a type/domain of the destination PSAP 155, 160.

In response to determining that the second call is of the second type and that the destination PSAP 155, 160 of the second call operates in the legacy PSAP domain 170, 180 or in another legacy PSAP domain 170, 180, at block 650, the first electronic processor 205 generates a crafted number identification (e.g., a crafted pANI) for the second call, and delivers, via the first network interface 215, the second call to the destination PSAP 155, 160 of the second call along with the crafted number identification for the second call. In some instances, block 650 may be similar to block 535 of FIG. 5 and the same explanation applies regarding how the first electronic processor 205 delivers the second call to the destination PSAP 155, 160.

As indicated in FIG. 6, after performing block 650, the method 600 may proceed back to block 605 to repeat the method 600 to continue receiving calls and to continue analyzing and routing received calls as explained herein.

Figure 7:
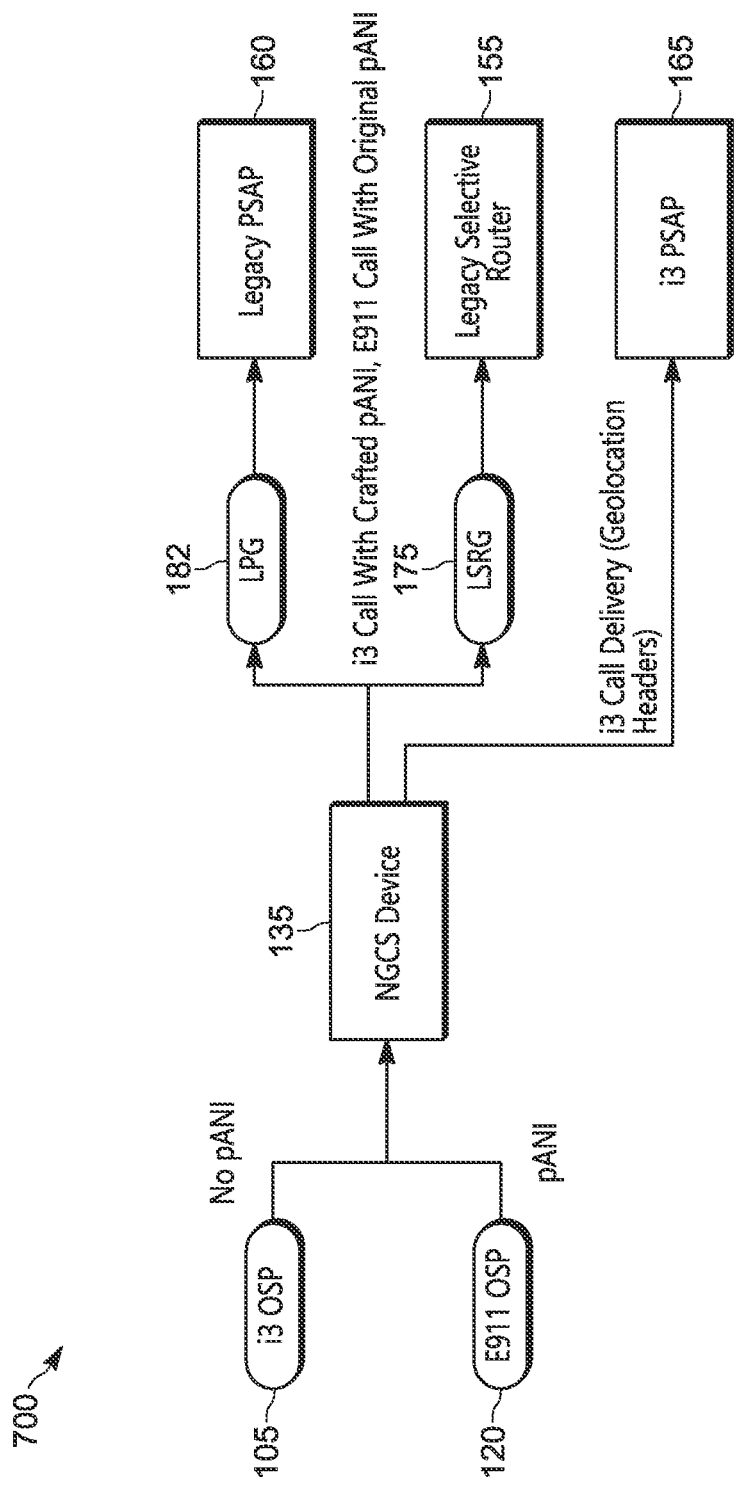
FIG. 7 is a call flow diagram for a number of example situations that may occur during one or more executions of the methods FIGS. 5 and 6 according to one example aspect.

FIG. 7 illustrates a call flow diagram for a number of example situations that may occur during one or more executions of the methods 500 and/or 600. As shown in FIG. 7, the NGCS device 135 may receive a first call from the e-911 OSP device 120. The first call may include a pANI (e.g., an original pANI). The NGCS device 135 may also receive a second call from i3 OSP device 105. The second call may not include a pANI. Depending on a destination device 155, 160, 165 of the received calls, the NGCS device 135 may or may not augment call information of the received calls before delivering the received calls to their respective destination devices 155, 160, 165.

As indicated in FIG. 7, when the destination device 165 is an i3 PSAP 165, the NGCS device 135 delivers an i3 call (either in its original form or upgraded from the legacy e-911 call) that includes a geolocation header and/or a call SIP header as explained with respect to blocks 545 and 550 of FIG. 5. On the other hand, when the destination device 155, 160 is a legacy PSAP 160 or a legacy selective router 155, NGCS device 135 delivers the i3 call downgraded to include a crafted pANI and delivers the e-911 call with its original pANI. Thus, the NGCS device 135 is configured to dynamically deliver different types of calls to different types of destination devices 155, 160, 165 depending on the type of call, the type/domain of the destination device 155, 160, 165, or both the type of call and the type/domain of the destination device 155, 160, 165.

In some instances, after a call has been delivered to a destination device 155, 160, 165, the destination device 155, 160, 165 transmits a conference/transfer request (e.g., network conference request such as a session initiation protocol (SIP) request) back to the NGCS device 135 to initiate a conference call that includes another destination device 155, 160, 165 or to transfer the call to another destination device 155, 160, 165. When such a request is received, the NGCS device 135 may use similar principles as described herein with respect to receiving new calls and assessed based on the characteristics (upgraded (e.g., i3) or not upgraded (e.g., legacy)) of the new destination device/PSAP 155, 160, 165 targeted by the transfer/conference in order to analyze and route the calls associated with such requests. Additionally, as explained previously herein, the NGCS device 135 may have stored information about the call associated with the conference/transfer request that allows the NGCS device 135 to identify a type of call and to use previously stored information to create header information or retrieve an original pANI to deliver the call to a conference/transfer destination device 155, 160, 165 even if the original pANI is not included in the conference/transfer request.

Figure 8C:
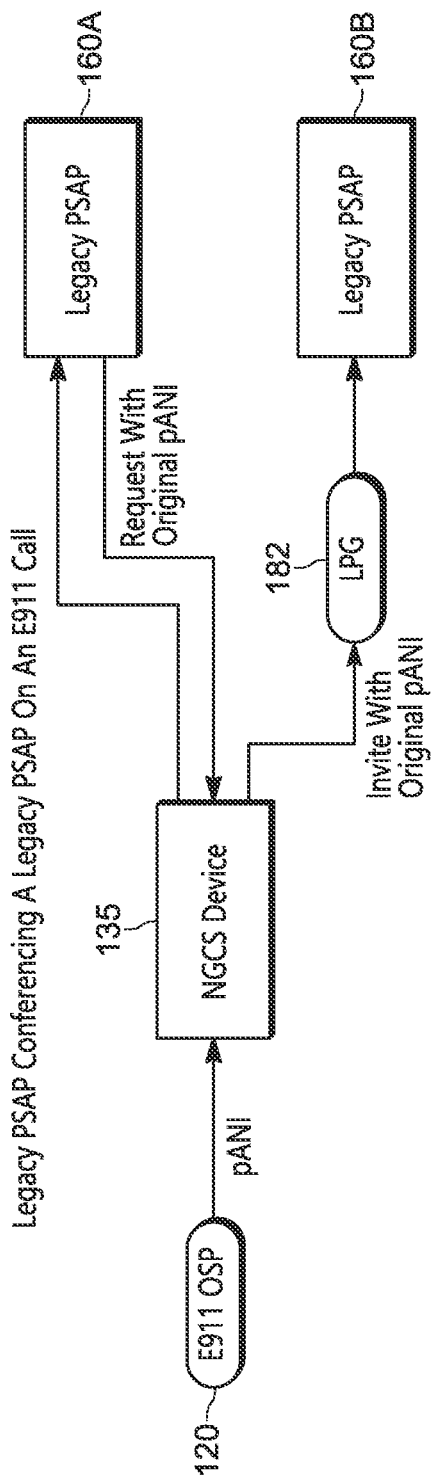

FIGS. 8A-8C illustrate three distinct call flow diagrams for example situations in which the NGCS device 135 receives a conference/transfer request from a destination device 155, 160, 165 regarding a call that was previously delivered to the destination device 155, 160, 165, by the NGCS device 135.

FIG. 8A illustrates an example call flow diagram involving an original call of the second type (e.g., an upgraded call) that is delivered to an upgraded PSAP 165 that then transmits a conference/transfer request back to the NGCS device 135 to deliver the call to a legacy PSAP 160. In some instances, the NGCS device 135 may deliver the original upgraded call to upgraded PSAP 165 in accordance with the explanation of block 550 of FIG. 5. The NGCS device 135 may later receive a conference/transfer request from the upgraded PSAP 165 such as a SIP refer that includes call information, for example, included in an emergency incident data object (EIDO). The call information may also include i3 OSP owned geolocation header information and/or call SIP header information since the call was originally an upgraded/i3 call that was merely passed on to the upgraded PSAP 165 without being augmented (e.g., in accordance with block 550 of FIG. 5).

In response to receiving the conference/transfer request from the upgraded PSAP 165, the NGCS device 135 performs block 520 and some of blocks 525-550 to deliver the call to another destination device 155, 160, 165. For example, the NGCS device 135 may determine the destination device 155, 160, 165 based on a location or identity included in the conference/transfer request and/or in the call information. For example, an operator at the upgraded PSAP 165 may provide, in the conference/transfer request and/or in the call information, an indication of a specific destination device 155, 160, 165 or of a specific location near which another destination device 155, 160, 165 is desired to be added to a conference call. The NGCS device 135 may determine the destination device 155, 160, 165 based on the provided indication in a similar manner as described previously herein with respect to block 520 of FIG. 5. Additionally, the NGCS device 135 may determine a call type of the call (e.g., an original call type of the original call) as described previously herein with respect to block 525 of FIG. 5. For example, the NGCS device 135 may reference previously stored information (e.g., from the crafted pANI database 150) about the call when the call was originally received by the NGCS device 135 to determine whether the call was flagged/indicated to be of the first type or the second type.

In the example shown in FIG. 8A, the conference/transfer request indicates that the call is currently in the upgraded format (e.g., second call type). The previously stored information about the call (e.g., retrieved using identification information from header information of the call) may also indicate that the call was originally received in the upgraded format (e.g., second call type). Additionally, the NGCS device 135 may determine that the destination PSAP 155, 160, 165 is a legacy PSAP 160. Accordingly, the NGCS device 135 may perform actions in accordance with the explanation of block 535 of FIG. 5 to create and transmit a crafted pANI along with the call to the legacy PSAP 160.

FIG. 8B illustrates an example call flow diagram involving an original call (e.g., a third call) of the first type (e.g., a legacy call) that is delivered to an upgraded PSAP 165 that then transmits a conference/transfer request back to the NGCS device 135 to deliver the call to a legacy PSAP 160. In some instances, the NGCS device 135 may deliver an upgraded version of the original call to upgraded PSAP 165 in accordance with the explanation of block 545 of FIG. 5. For example, in response to determining that the third call is of the first type (e.g., a legacy call) and that the first destination PSAP 155, 160, 165 of the third call operates in the upgraded PSAP domain 185, the NGCS device 135 generates an upgraded header in accordance with the upgraded PSAP domain 185, and delivers, via the first network interface 215, the third call to the first destination PSAP 165 of the third call along with the upgraded header. The NGCS device 135 may also store, in the first memory 210, information about the third call. The information about the third call may include an original number identification (e.g., an original pANI) of the third call that was removed from the call information during the upgrading to an upgraded call. The stored information about the third call may also include an indication that the third call is of the first type (e.g., an original type of the first call is legacy call). The NGCS device 135 may later receive a conference/transfer request from the upgraded PSAP 165 such as a SIP refer that includes call information, for example, included in an EIDO. The call information may also include NGCS owned geolocation header information and/or call SIP header information since the call was originally a legacy call that was upgraded to include geolocation header information by the NGCS device 135 (e.g., in accordance with block 545 of FIG. 5).

In response to receiving the conference/transfer request from the upgraded PSAP 165, the NGCS device 135 performs block 520 and some of blocks 525-550 to deliver the call to another destination device 155, 160, 165 (e.g., a second destination device 155, 160, 165). For example, the NGCS device 135 may determine the second destination device 155, 160, 165 based on a location or identity included in the conference/transfer request and/or in the call information as explained previously herein with respect to FIG. 8A. Additionally, the NGCS device 135 may determine a call type of the third call (e.g., an original call type of the original call) as described previously herein with respect to block 525 of FIG. 5. For example, the NGCS device 135 may reference previously stored information (e.g., from the crafted pANI database 150) about the third call when the third call was originally received by the NGCS device 135 to determine whether the third call was flagged/indicated to be of the first type or the second type.

In the example shown in FIG. 8B, the conference/transfer request indicates that the third call is currently in the upgraded format (e.g., second call type). The previously stored information about the third call (e.g., retrieved using identification information from header information of the call) may indicate that the third call was originally received in the legacy format (e.g., legacy call type). Additionally, the NGCS device 135 may determine that the second destination PSAP 155, 160, 165 operates in a legacy PSAP domain 170, 180. In response to determining that the third call is of the first type and that the second destination PSAP 155, 160, 165 of the third call operates in the legacy PSAP domain 170, 180, the NGCS device 135 delivers, via the first network interface 215, the third call to the second destination PSAP 160 of the third call along with the original number identification (e.g., original pANI) of the third call. In other words, the NGCS device 135 may perform actions in accordance with the explanation of block 530 of FIG. 5 to retrieve the original pANI of the original third call and transmit the original pANI along with the call to the legacy PSAP 160 in a legacy format even though the conference/transfer request of the third call indicated that the third call was an upgraded/i3 call. The use of the original pANI in this situation provides similar advantages as described previously herein with respect to block 530 of FIG. 5.

FIG. 8C illustrates an example call flow diagram involving an original call of the first type (e.g., a legacy call) that is delivered to a legacy PSAP 160A that then transmits a conference/transfer request back to the NGCS device 135 to deliver the call to another legacy PSAP 160B. In some instances, the NGCS device 135 may deliver the original legacy call to legacy PSAP 160A in accordance with the explanation of block 530 of FIG. 5. The NGCS device 135 may later receive a conference/transfer request from the legacy PSAP 160A that includes call information such as the original pANI.

In response to receiving the conference/transfer request from the legacy PSAP 160A, the NGCS device 135 performs block 520 and some of blocks 525-550 to deliver the call to another destination device 155, 160, 165. For example, the NGCS device 135 may determine the destination device 155, 160, 165 using the original pANI included in the conference/transfer request and/or in the call information. Additionally, the NGCS device 135 may determine a call type of the call (e.g., an original call type of the original call) as described previously herein with respect to block 525 of FIG. 5. For example, the NGCS device 135 may reference previously stored information (e.g., from the crafted pANI database 150) about the call when the call was originally received by the NGCS device 135 to determine whether the call was flagged/indicated to be of the first type or the second type.

In the example shown in FIG. 8C, the conference/transfer request indicates that the call is currently in the legacy format (e.g., first call type). The previously stored information about the call (e.g., retrieved using identification information such as the original pANI) may also indicate that the call was originally received in the legacy format (e.g., first call type). Additionally, the NGCS device 135 may determine that the destination PSAP 155, 160, 165 is a legacy PSAP 160B. Accordingly, the NGCS device 135 may perform actions in accordance with the explanation of block 530 of FIG. 5 to transmit the original pANI along with the call to the legacy PSAP 160B in a legacy format.

FIGS. 8A-8C represent only some of the various examples/situations that may occur when conferencing/transferring a call to another destination device 155, 160, 165. However, different paths through the method 500 of FIG. 5 indicate the various other examples/situations that may occur (e.g., different original call types; different first destination devices 155, 160, 165 to which the call was originally delivered; and different second destination devices 155, 160, 165 to which the call is later delivered).

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
a network interface configured to
    receive a plurality of calls of a first type from a first type of originating service provider (OSP), wherein each call of the plurality of calls of the first type includes a respective original number identification, and
    receive a plurality of calls of a second type from a second type of OSP, wherein each call of the plurality of calls of the second type does not include the respective original number identification; and
an electronic processor coupled to the network interface, the electronic processor configured to
    receive a first call via the network interface,
    determine that the first call is of the first type,
    determine that a destination public safety answering point (PSAP) of the first call operates in a legacy PSAP domain,
    in response to determining that the first call is of the first type and that the destination PSAP of the first call operates in the legacy PSAP domain, deliver, via the network interface, the first call to the destination PSAP of the first call along with an original number identification of the first call, receive a second call via the network interface, determine that the second call is of the second type, determine that a destination PSAP of the second call operates in the legacy PSAP domain or in another legacy PSAP domain, and in response to determining that the second call is of the second type and that the destination PSAP of the second call operates in the legacy PSAP domain or in another legacy PSAP domain, generate a crafted number identification for the second call, and deliver, via the network interface, the second call to the destination PSAP of the second call along with the crafted number identification for the second call.

2. The electronic computing device of claim 1, further comprising a memory, wherein the electronic processor is configured to:

store, in the memory, first information about the first call, wherein the first information includes the original number identification of the first call and an indication that the first call is of the first type; and store, in the memory, second information about the second call, wherein the second information includes the crafted number identification of the second call and an indication that the second call is of the second type.

3. The electronic computing device of claim 1, wherein the original number identification of the first call is configured to be used by the destination PSAP of the first call to query location information of the first call; and wherein the crafted number identification for the second call is configured to be used by the destination PSAP of the second call to query location information of the second call.

4. The electronic computing device of claim 1, wherein the electronic processor is configured to determine that the first call is of the first type in response to at least one of the group consisting of:

(i) determining that a geolocation header is not present in call information of the first call;

(ii) determining that the geolocation header is present in the call information of the first call and that the geolocation header does not include a location by value or a location by reference that points outside of a location database maintained by the electronic computing device;

(iii) determining that a geolocation routing header is not present in the call information of the first call;

(iv) determining that a number identification of the first call points to the location database maintained by the electronic computing device and the location database indicates that the first call is of the first type; and (v) combinations of (i) through (iv).

5. The electronic computing device of claim 1, wherein the electronic processor is configured to determine that the destination PSAP of the first call operates in the legacy PSAP domain by:

determining the destination PSAP of the first call based on call information of the first call; and interrogating the destination PSAP to determine an operating domain, referencing a stored mapping of the destination PSAP to determine the operating domain, or both interrogating the destination PSAP and referencing the stored mapping to determine the operating domain.

6. The electronic computing device of claim 1, further comprising a memory, wherein the electronic processor is configured to:

receive a third call via the network interface;

determine that the third call is of the first type;

determine that a first destination PSAP of the third call operates in an upgraded PSAP domain;

in response to determining that the third call is of the first type and that the first destination PSAP of the third call operates in the upgraded PSAP domain, generate an upgraded header in accordance with the upgraded PSAP domain, deliver, via the network interface, the third call to the first destination PSAP of the third call along with the upgraded header, and store, in the memory, information about the third call, wherein the information about the third call includes an original number identification of the third call and an indication that the third call is of the first type;

receive a network conference request regarding the third call from the first destination PSAP of the third call;

in response to receiving the network conference request from the first destination PSAP of the third call, determine that the third call associated with the network conference request is of the first type by referencing the information about the third call stored in the memory, determine that a second destination PSAP of the third call operates in the legacy PSAP domain or in another legacy PSAP domain, and in response to determining that the third call is of the first type and that the second destination PSAP of the third call operates in the legacy PSAP domain or in another legacy PSAP domain, deliver, via the network interface, the third call to the second destination PSAP of the third call along with the original number identification of the third call.

7. The electronic computing device of claim 1, wherein the first call of the first type includes an e-911 call, and wherein the first OSP includes a legacy OSP;

wherein the second call of the second type includes an i3 call, and wherein the second OSP includes an i3 OSP;

wherein the original number identification of the first call includes an original pseudo automatic number identification (pANI), and wherein the crafted number identification for the second call includes a crafted pANI; and wherein the destination PSAP of the first call includes a legacy PSAP, a legacy selective router, or both the legacy PSAP and the legacy selective router.

8. A method of delivering calls, the method comprising:

receiving, with a network interface of an electronic computing device, a plurality of calls of a first type from a first type of originating service provider (OSP), wherein each call of the plurality of calls of the first type includes a respective original number identification;

receiving, with the network interface, a plurality of calls of a second type from a second type of OSP, wherein each call of the plurality of calls of the second type does not include the respective original number identification;

receiving, with an electronic processor of the electronic computing device, a first call via the network interface;

determining, with the electronic processor, that the first call is of the first type;

determining, with the electronic processor, that a destination public safety answering point (PSAP) of the first call operates in a legacy PSAP domain;

in response to determining that the first call is of the first type and that the destination PSAP of the first call operates in the legacy PSAP domain, delivering, with the electronic processor and via the network interface, the first call to the destination PSAP of the first call along with an original number identification of the first call;

receiving, with the electronic processor, a second call via the network interface;

determining, with the electronic processor, that the second call is of the second type;

determining, with the electronic processor, that a destination PSAP of the second call operates in the legacy PSAP domain or in another legacy PSAP domain; and in response to determining that the second call is of the second type and that the destination PSAP of the second call operates in the legacy PSAP domain or in another legacy PSAP domain, generating, with the electronic processor, a crafted number identification for the second call, and delivering, with the electronic processor and via the network interface, the second call to the destination PSAP of the second call along with the crafted number identification for the second call.

9. The method of claim 8, further comprising:

storing, with the electronic processor and in a memory of the electronic computing device, first information about the first call, wherein the first information includes the original number identification of the first call and an indication that the first call is of the first type; and storing, with the electronic processor in the memory, second information about the second call, wherein the second information includes the crafted number identification of the second call and an indication that the second call is of the second type.

10. The method of claim 8, wherein the original number identification of the first call is configured to be used by the destination PSAP of the first call to query location information of the first call; and wherein the crafted number identification for the second call is configured to be used by the destination PSAP of the second call to query location information of the second call.

11. The method of claim 8, wherein determining that the first call is of the first type includes determining that the first call is of the first type in response to at least one of the group consisting of:

(i) determining that a geolocation header is not present in call information of the first call;

(ii) determining that the geolocation header is present in the call information of the first call and that the geolocation header does not include a location by value or a location by reference that points outside of a location database maintained by the electronic computing device;

(iii) determining that a geolocation routing header is not present in the call information of the first call;

(iv) determining that a number identification of the first call points to the location database maintained by the electronic computing device and the location database indicates that the first call is of the first type; and (v) combinations of (i) through (iv).

12. The method of claim 8, wherein determining that the destination PSAP of the first call operates in the legacy PSAP domain includes:

determining the destination PSAP of the first call based on call information of the first call; and interrogating the destination PSAP to determine an operating domain, referencing a stored mapping of the destination PSAP to determine the operating domain, or both interrogating the destination PSAP and referencing the stored mapping to determine the operating domain.

13. The method of claim 8, further comprising:

receiving, with the electronic processor, a third call via the network interface;

determining, with the electronic processor, that the third call is of the first type;

determining, with the electronic processor, that a first destination PSAP of the third call operates in an upgraded PSAP domain;

in response to determining that the third call is of the first type and that the first destination PSAP of the third call operates in the upgraded PSAP domain, generating, with the electronic processor, an upgraded header in accordance with the upgraded PSAP domain, delivering, with the electronic processor and via the network interface, the third call to the first destination PSAP of the third call along with the upgraded header, and storing, in a memory of the electronic computing device, information about the third call, wherein the information about the third call includes an original number identification of the third call and an indication that the third call is of the first type;

receiving, via the network interface, a network conference request regarding the third call from the first destination PSAP of the third call;

in response to receiving the network conference request from the first destination PSAP of the third call, determining, with the electronic processor, that the third call associated with the network conference request is of the first type by referencing the information about the third call stored in the memory, determining, with the electronic processor, that a second destination PSAP of the third call operates in the legacy PSAP domain or in another legacy PSAP domain, and in response to determining that the third call is of the first type and that the second destination PSAP of the third call operates in the legacy PSAP domain or in another legacy PSAP domain, delivering, with the electronic processor and via the network interface, the third call to the second destination PSAP of the third call along with the original number identification of the third call.

14. The method of claim 8, wherein the first call of the first type includes an e-911 call, and wherein the first OSP includes a legacy OSP;

wherein the second call of the second type includes an i3 call, and wherein the second OSP includes an i3 OSP;

wherein the original number identification of the first call includes an original pseudo automatic number identification (pANI), and wherein the crafted number identification for the second call includes a crafted pANI; and wherein the destination PSAP of the first call includes a legacy PSAP, a legacy selective router, or both the legacy PSAP and the legacy selective router.

* * * * *